United States Patent Office 2,768,423
Patented Oct. 30, 1956

2,768,423

SAW TOOTH CONSTRUCTION AND METHOD OF MAKING THE SAME

William Stern, Park Ridge, Ill., assignor to Illinois Tool Works, Chicago, Ill., a corporation of Illinois Application June 27, 1952, Serial No. 295,989

4 Claims. (Cl. 29—95)

The present invention relates to saws, and more particularly to saws especially adapted for cutting metal. One problem of particular concern in cutting metal is that the chips cut from the metal work piece are caught in some pockets between the teeth of the saw and tends to jam the cutting edges thereof. It is, therefore, among the objects of this invention to provide a novel tooth construction for saws by which construction the chips are directed away from the cutting edges of the teeth, and the volume of the pockets between the teeth is increased for a given tooth size, whereby to reduce substantially the possibility of the chips jamming the saw.

Another object of the present invention is to provide a novel tooth construction for saws of the above general type, wherein the cutting edges of the teeth are disposed at an angle for efficiently and cleanly cutting a work piece.

Another object of this invention is to provide a novel tooth construction having the above described characteristics, which tooth construction may be quickly and relatively inexpensively produced.

Still another object of this invention is to provide a novel method for manufacturing saw blades having teeth of the above described type, by which method the saw blades may be continuously, quickly, and inexpensively produced.

Other objects and advantages of the present invention will be apparent from the following description and the drawings, wherein:

Fig. 1 is a side view, showing a saw blade involving the principles of this invention;

Fig. 2 is an enlarged fragmentary side view, showing the novel tooth construction of this invention;

Fig. 3 is a plan view of the teeth shown in Fig. 2;

Fig. 4 is a partial vertical cross section taken along line 4—4 in Fig. 2;

Fig. 5 is a vertical cross section similar to that shown in Fig. 4, but showing the teeth at an intermediate stage of construction;

Fig. 6 is a schematic view illustrating a mechanism by which the novel method of this invention may be practiced; and Fig. 7 is a schematic view, showing the positions of the teeth cutting hobs relative to a saw blade.

Referring now more specifically to the drawings, wherein like parts are designated by the same numerals throughout the various figures, a saw blade 10 embodying this invention is shown in Fig. 1. The blade 10 is preferably constructed of carbon or high-speed steel which may be heat treated to particularly adapt the saw for cutting metals after the teeth have been formed as hereinafter described. The saw blade 10 includes a plurality of cutting teeth formed along one longitudinal edge thereof.

Figs. 2, 3, and 4 are enlarged views, showing the novel cutting tooth construction of this invention. Since alternate teeth are formed in the same manner, only two adjacent teeth 12 and 14 will be described in detail. Each tooth 12 includes a leading face or edge 16 and a trailing face or edge 18, and each tooth 14 includes a similar leading edge 20 and a trailing edge or face 22. As shown best in Fig. 2, the leading faces 16 and 20 extend outwardly from the root of the tooth on the blade 10 and substantially normally to a longitudinal axis and the peripheral longitudinal edge of the blade. The trailing edges or faces 18 and 22 are inclined relative to and intersect the leading faces 16 and 20, respectively. The inclined trailing edges or faces 18 merge with the bottom or inner ends of the leading faces 16 to form pockets 24 between the teeth. The inclined trailing faces 18 also intersect, as described above, the outer ends of the leading faces or edges 16 to provide cutting edges 26 at the terminal ends of the teeth 12. The trailing edges 22 are similarly arranged to provide pockets 28 and cutting edges 30 on the teeth 14. As shown best in Fig. 3, the teeth 12 and 14 are deformed or displaced from the roots thereof laterally outwardly from opposite sides of the blade 10. The teeth 12 and 14 are displaced outwardly in opposite directions so as to provide a saw blade having its teeth alternately displaced to provide cutting edges 32 and 34 extending beyond the sides of the body of the blade 10, in order to provide a clean sided cut or kerf in a work piece. As shown in Fig. 4, the teeth are outwardly displaced to a position where their terminal cutting edges 26 and 30 overlap and lie in the same plane, which plane extends parallel to the longitudinal axis of the blade 10. This structure insures a clean broad cut in the bottom of the kerf in a work piece, not shown.

It should be noted that in accordance with this invention, substantially the entire leading edge or face 16 of the tooth 12 lies in a plane extending substantially normally to the longitudinal axis of the blade. The plane of the face 16 also extends transversely of the plane of the blade 10, as viewed in Fig. 2, and is inclined at an oblique angle to the plane of the blade, as shown best in Fig. 3. Thus, the terminal cutting edge 26 also lies at an oblique angle to the plane of the blade 10 and is inclined rearwardly from the side cutting edge 32 and from the direction of cutting movement of the blade, which direction is toward the right as viewed in Figs. 2 and 3. This structure presents the terminal cutting edge 26 at an angle to the work piece for the most efficient cutting action. Furthermore, it has been found that in the prior art saw blades having offset teeth with terminal cutting edges extending substantially perpendicular to the plane of the blade, there is a tendency for the teeth to be deformed or moved inwardly towards each other during use. However, because of the angular disposition of the terminal cutting edge 26 and of the leading face 16 of the tooth 12 of this invention, the forces directed against the tooth 12 tend to cause the tooth to remain in its laterally offset position. In addition, because of the angular disposition of the leading face 16 and the terminal cutting edge 26, the chips cut from the work piece are moved away from the cutting edge 26 and the side cutting edge 32, thereby substantially reducing the tendency of the chips to jam the cutting edges.

As shown in Fig. 3, the leading face or edge 20 and the terminal cutting edge 30 of the tooth 14 are disposed at an oblique angle to the plane of the blade 10 in a manner similar to but the reverse of the face 16 and cutting edge 26 of the tooth 12. The construction of the teeth 14 provides all of the advantages mentioned above for the teeth 12. In addition, it should be noted that the inclined trailing edges or faces of the teeth 12 and 14 are formed so that they lie in planes inclined to the plane of the blade 10, or, in other words, the trailing edges or faces 18 and 22 are formed so that they are progressively deeper from one side of the blade to the other, as shown in Figs. 2 and 4. By this structure, the volume of the pockets 24 and 26 for a given tooth size is increased so that more chips may be received in the pockets without jamming the cutting edges. The angular disposition of the leading faces 16 and 20 also helps to increase the size of the chip receiving pockets between the teeth.

The novel method for producing the blade 10 may be carried out by the mechanism schematically shown in Figs. 6 and 7. This mechanism includes a righthand or clockwise rotating hob 36, a lefthand or counterclockwise rotating hob 38 and a pair of setting rollers 40 and 42. Suitable means, not shown, may be provided for driving these parts in predetermined timed relationship. The hobs illustrated in Fig. 6 are of the tapered or conical type and are provided with helical cutting edges 44 and 46. The cutting edges 44 and 46 are inclined relative to the axes of the hobs and are of suitable shape to cut out the pockets 24 and 28 from the saw blade 10. When using conical hobs, as illustrated, it is important to position the hobs with their axes extending parallel to the saw blade so that the helical cutting edges will make progressively deeper cuts in the blade as the blade moves from the smaller end to the larger end of the hob. However, the tapered or conical hobs may be replaced by conventional cylinder hobs, not shown, which latter mentioned hobs will be positioned with their axes at an angle to the saw blade.

As shown in Fig. 7, the hobs 36 and 38 are positioned with their axes on opposite sides of the blade 10. Because of this arrangement, the pockets 24 and 28 are cut deeper in the side of the blade closest to the axis of the hob to form the inclined surfaces 18 and 22 so that they are progressively deeper from one side of the blade to the other, as was more fully described above.

When performing the method of this invention, a blade 10 is continuously fed at a uniform rate past the hobs and setting rollers by any suitable continuously moving conveyor mechanism, not shown, which conveyor mechanism is actuated by suitable means for driving it in timed relationship with the hobs and the setting rollers. Because of the helical formation of the cutting edges 44 and 46 of the hobs, the cutting edges are moved transversely across the blade at oblique angles, and the cutting edges are also moved in a direction parallel to the path of travel of the blade. Thus, the width of the notches cut in the blade is substantially equal to the width of the portion of the cutting edges 44 and 46 which engages the blade. The hob 36 first cuts out a series of spaced pockets 24 defined by the leading edges or faces 20 of the teeth 14 and the trailing faces 18 of the teeth 12. The lead of the helical cutting edge 34 of the hob 36 is sufficient to space the pockets 24 so that the teeth 12 and the pockets 28 may be formed therebetween. As the blade 10 advances, it is operated upon by the hob 38 to form pockets 28. It should be noted that the cutting edges 44 and 46 of the hobs have an axial length which is slightly greater than the longitudinal distance between the terminal cutting edges 26 and 30 on adjacent teeth 12 and 14 and that the hob 38 is positioned so that its cutting edge 46 slightly overlaps the adjacent spaced pockets 24 previously cut in the blade by the hob 36. Thus, the leading edges 16 of the teeth 12 are cut so that they intersect the previously cut inclined trailing edge or face 18 to form the terminal cutting edge 26, and the inclined trailing edges 22 of the teeth 14 are cut so that they intersect the previously cut leading edge or face 20 to form the terminal cutting edge 30. Because the inclined trailing edges or faces 18 and 22 are cut progressively deeper from one side of the blade to the other, as described above, the terminal cutting edges 26 and 30 are initially formed so that the tooth height at the forward end of the edges 26 and 30 adjacent the side of the teeth having side cutting edges 32 and 34 is less than the tooth height at the opposite side of the teeth so that the edges are inwardly inclined toward the body of the blade. In other words, adjacent terminal cutting edges 26 and 30 are initially disposed in planes which are inclined to each other and also inclined at opposite angles to the plane of the blade, as shown in Fig. 5. It should be noted that because edges 26 and 30 are initially formed at an angle to the plane of the blade, they are longer than the thickness of the blade, as clearly shown in Figs. 4 and 5. Hence, a longer terminal cutting edge is produced for a given blade thickness. The blade 10 then advances through the setting rollers 40 and 42, which deform or offset alternate teeth in opposite directions. The teeth are offset a sufficient amount to bring their terminal cutting edges into the same plane, which plane extends normally to the plane of the blade, as shown in Fig. 4. The blade is then complete, except for the heat treating process which may be carried out in the usual manner, and no additional filing or sharpening steps are necessary.

From the above description, it is seen that the present invention provides a novel method, wherein saw blades may be continuously and quickly manufactured. In addition, it is seen that the novel tooth construction of the blade provides a saw which has very efficient cutting characteristics and which may accommodate a greater volume of chips between the teeth without jamming the cutting edges of the teeth. Moreover, the angular disposition of the leading edges or faces of the teeth greatly reduces the tendency for the chips to jam the cutting edges and also eliminate the tendency for the offset teeth to move inwardly toward each other while the saw is in use.

While the preferred embodiments of the novel tooth construction and the method for producing it have been described herein, it is obvious that changes may be made without departing from the spirit and scope of the appended claims.

I claim:

1. A saw, comprising a blade having a plurality of teeth thereon, each of said teeth having a leading face lying in a plane extending laterally of and at an oblique angle to the plane of the blade, said teeth having terminal cutting edges lying substantially in a common plane, which common plane is substantially normal to the plane of the blade, and alternate teeth being displaced laterally in opposite directions from their roots to their terminal edges, said oblique angle being such that said leading faces and said cutting edges are respectively inclined rearwardly from outermost sides of the teeth.

2. A saw, comprising a blade of a given thickness and having a plurality of teeth thereon, each of said teeth having a leading face lying in a plane extending laterally of and at an oblique angle to the plane of the blade, said teeth having terminal cutting edges disposed substantially in a common plane, which common plane is substantially normal to the plane of the blade, each of said terminal cutting edges having a length which is greater than the thickness of the blade, and alternate teeth being displaced laterally in opposite directions from their roots to their terminal edges, said oblique angle being such that said leading faces and said cutting edges are respectively inclined rearwardly from outermost sides of the teeth.

3. A saw, comprising a blade having a plurality of teeth thereon, each of said teeth having a leading face lying in a plane extending transversely of and inclined at an oblique angle to the plane of the blade, each of said teeth also having a trailing face, which trailing face is inclined relative to and intersects said leading face, the junctions of the leading faces and trailing faces of said teeth providing terminal cutting edges lying substantially in a common plane, which common plane is substantially normal to the plane of the blade, alternate teeth being displaced laterally in opposite directions from their roots to their terminal edges, said oblique angle being such that said leading faces and said cutting edges are respectively inclined rearwardly from outermost sides of the teeth, and said trailing faces being progressively deeper from one side of the blade to the other.

4. A saw, comprising a blade of a given thickness and having a plurality of teeth thereon, each of said teeth having a leading face lying in a plane extending laterally of and at an oblique angle to the plane of the blade, each of said teeth also having a trailing face inclined relative to and intersecting said leading face, the junctions of the leading and trailing faces of said teeth providing terminal cutting edges lying substantially in a common plane, which common plane is substantially normal to the plane of the blade, alternate teeth being displaced laterally in opposite directions substantially from their roots to their terminal cutting edges, said oblique angle being such that said leading faces and said cutting edges are respectively inclined rearwardly from outermost sides of the teeth, each of said terminal cutting edges having a length greater than the thickness of the blade, and the trailing faces being progressively deeper from one side of the blade to the other.

References Cited in the file of this patent

UNITED STATES PATENTS

| | | |
|---|---|---|
| 511,473 | Szekely | Dec. 26, 1893 |
| 1,130,649 | Whiteaker | Mar. 2, 1915 |
| 1,463,880 | Evans | Aug. 7, 1923 |
| 1,473,374 | Konig | Nov. 6, 1923 |
| 1,480,627 | Muller | Jan. 15, 1924 |
| 2,227,864 | Ronan | Jan. 7, 1941 |